No. 721,857. PATENTED MAR. 3, 1903.
W. G. BOSWELL.
LUMBER REGISTERING ATTACHMENT.
APPLICATION FILED NOV. 25, 1902.
NO MODEL. 6 SHEETS—SHEET 1.
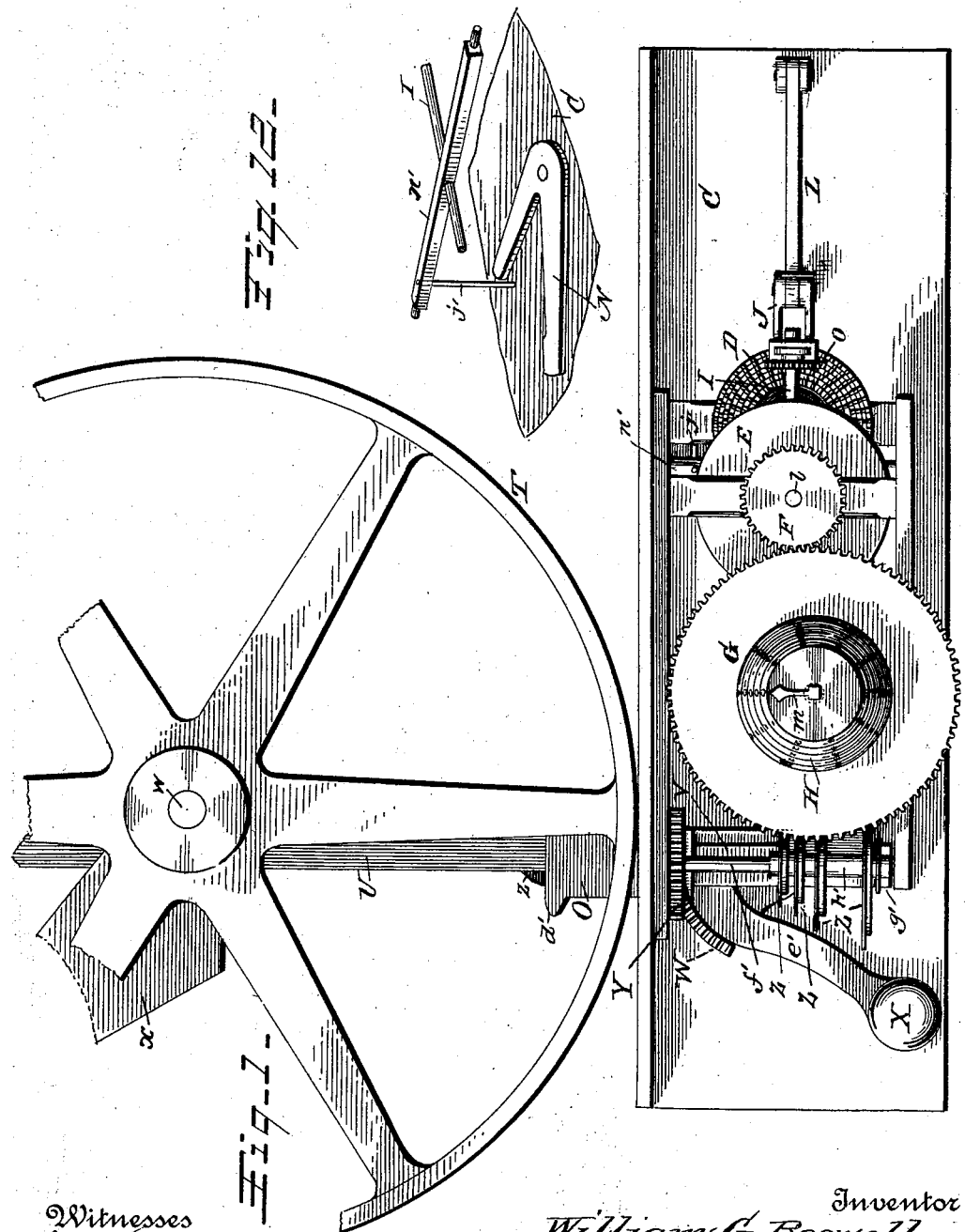
Witnesses
Inventor
William G. Boswell.
per Chas. H. Fowler
Attorney

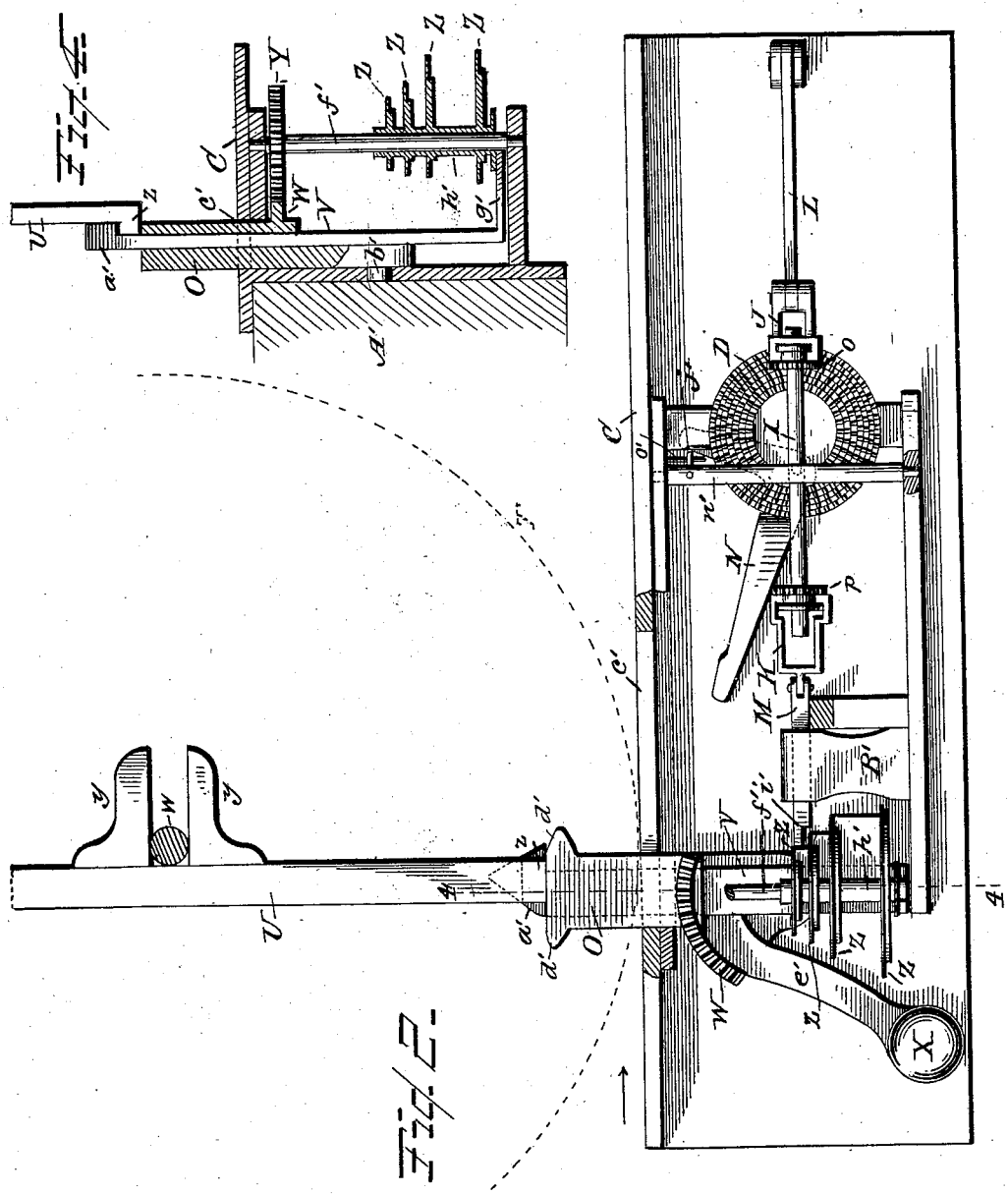

No. 721,857. PATENTED MAR. 3, 1903.
W. G. BOSWELL.
LUMBER REGISTERING ATTACHMENT.
APPLICATION FILED NOV. 25, 1902.
NO MODEL. 6 SHEETS—SHEET 3.
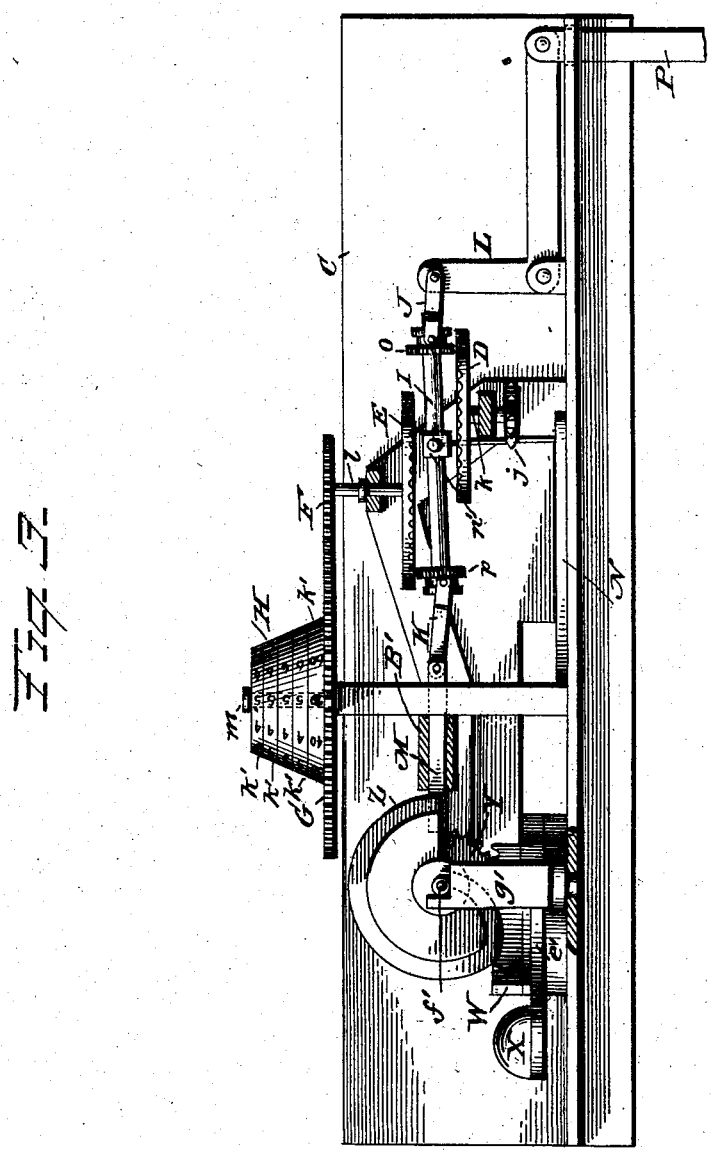
Witnesses
C. J. Williamson.
M. E. Moore.
Inventor
William G. Boswell.
per Chas. H. Fowler.
Attorney No. 721,857. PATENTED MAR. 3, 1903.
W. G. BOSWELL.
LUMBER REGISTERING ATTACHMENT.
APPLICATION FILED NOV. 25, 1902.
NO MODEL. 6 SHEETS—SHEET 4.
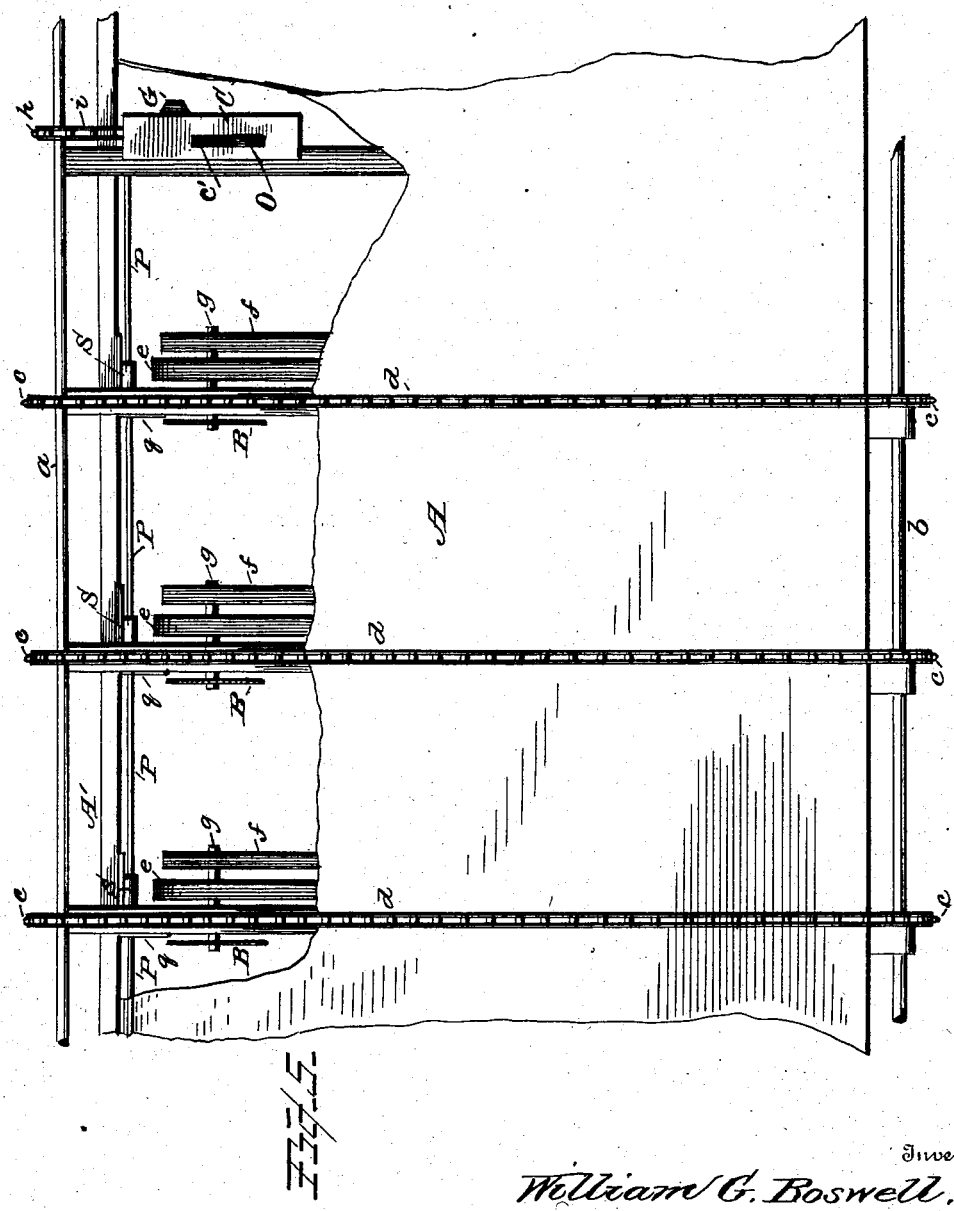

No. 721,857. PATENTED MAR. 3, 1903.
W. G. BOSWELL.
LUMBER REGISTERING ATTACHMENT.
APPLICATION FILED NOV. 25, 1902.
NO MODEL. 6 SHEETS—SHEET 5.
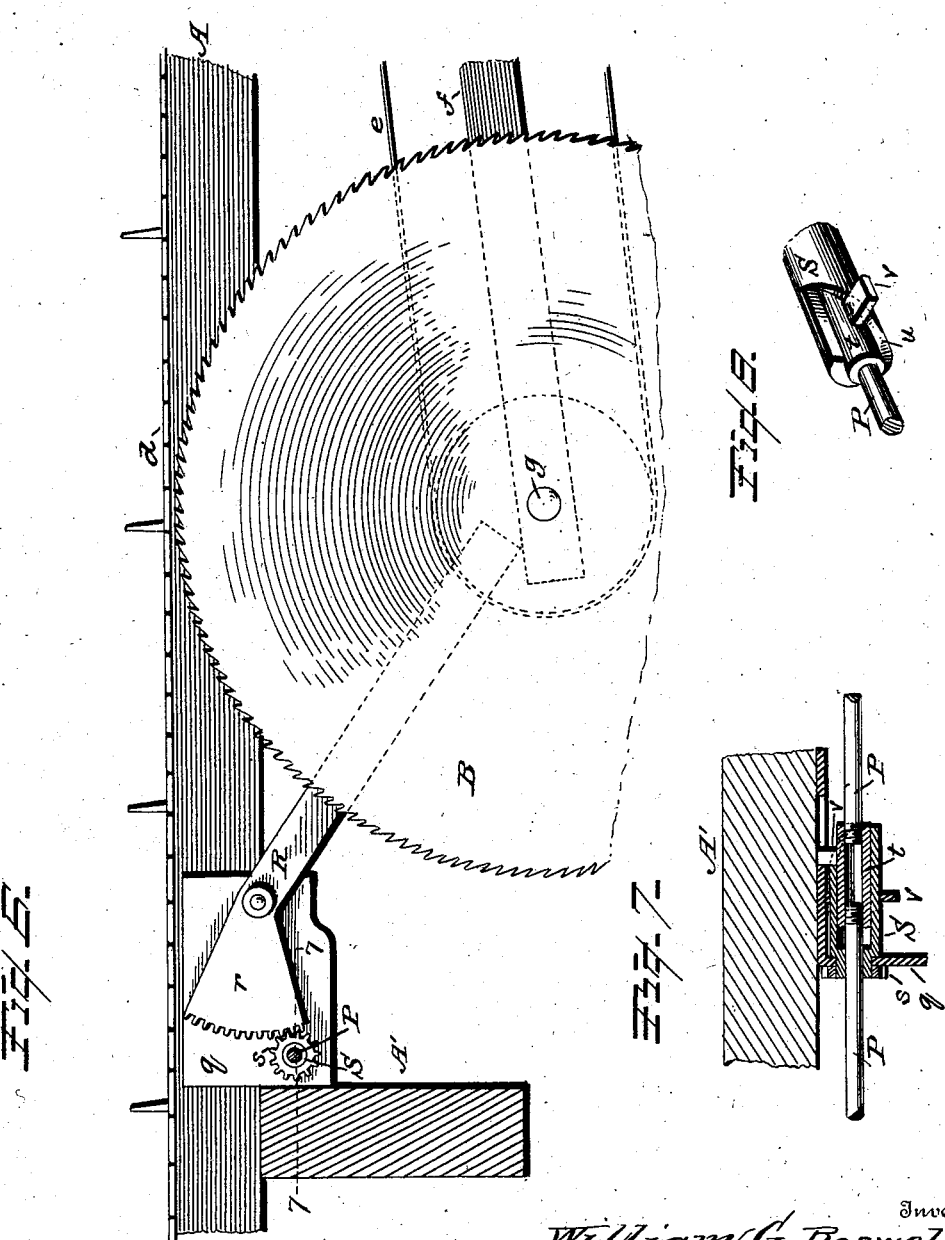
Witnesses
C. J. Williamson.
M. E. Moore.
Inventor
William G. Boswell.
By Chas. N. Fowler
Attorney No. 721,857. PATENTED MAR. 3, 1903.
W. G. BOSWELL.
LUMBER REGISTERING ATTACHMENT.
APPLICATION FILED NOV. 25, 1902.
NO MODEL. 6 SHEETS—SHEET 6.
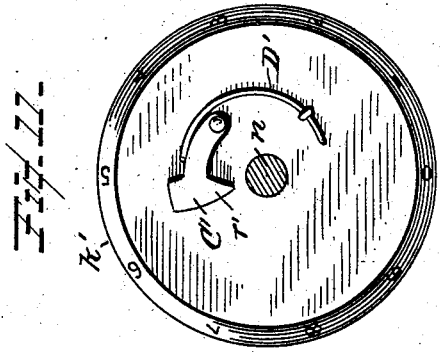
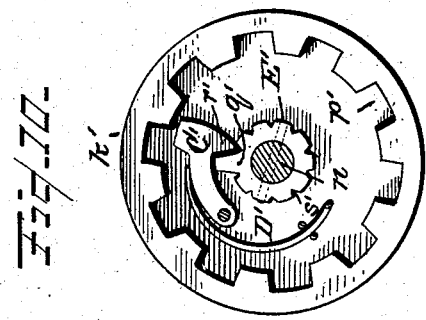
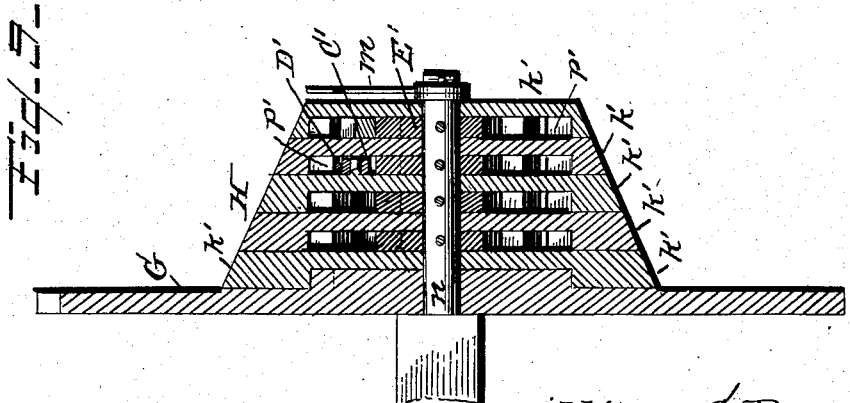
Witnesses
Inventor
William G. Boswell.
per Chas. H. Fowler
Attorney

UNITED STATES PATENT OFFICE.

WILLIAM G. BOSWELL, OF SOLEDAD, CALIFORNIA.

LUMBER-REGISTERING ATTACHMENT.

SPECIFICATION forming part of Letters Patent No. 721,857, dated March 3, 1903.

Application filed November 25, 1902. Serial No. 132,725. (No model.)

*To all whom it may concern:*

Be it known that I, WILLIAM G. BOSWELL, a citizen of the United States, residing at Soledad, in the county of Monterey and State of California, have invented certain new and useful Improvements in Lumber-Registering Attachments; and I do hereby declare that the following is a full, clear, and exact description of the same, reference being had to the annexed drawings, making a part of this specification, and to the letters of reference marked thereon.

The present invention has for its object to provide a simple, practically-operating, and effective device that may be conveniently connected to the trimmer of a sawmill, whereby the number of feet (board measure) in a given piece of lumber as it passes over the trimmer may automatically and accurately be ascertained upon a suitable register operated by mechanism connecting therewith and with the saw.

The invention consists in a lumber-registering attachment to the trimmers of sawmills, constructed substantially as shown in the drawings and hereinafter described and claimed.

Figure 1 of the drawings represents a side elevation of the lumber-registering attachment embodying my invention; Fig. 2, a similar view, partly in section, showing the presser-wheel in dotted lines and the register and a portion of the mechanism for operating the same removed; Fig. 3, a bottom plan view showing the operating mechanism; Fig. 4, a detail sectional view taken on line 4 4 of Fig. 2; Fig. 5, a plan view of a portion of the trimmer of a sawmill with the registering attachment connected thereto; Fig. 6, a detail sectional view, on an enlarged scale, of the trimmer and operating mechanism connecting with the saw; Fig. 7, a detail horizontal section taken on line 7 7 of Fig. 6; Fig. 8, a detail perspective view of the cam device; Fig. 9, a sectional elevation of the register; Fig. 10, a horizontal section through the register; Fig. 11, a top plan view of one of the register-disks; Fig. 12, a perspective detail view showing the manner of connecting the bell-crank lever with the pivoted bracket and the means for operating the bracket.

In Fig. 5 of the drawings I have shown a portion of an ordinary lumber-trimmer of a sawmill, which in the present instance comprises in part a suitable table A, supported on a frame A' in any desirable manner. Connected to the frame A' are the usual shafts $a\,b$, connecting with the driving power for imparting thereto a rotary motion, as is common in lumber-trimmers, said shafts having sprocket-wheels $c$ thereon, with which engage sprocket-chains $d$ to carry along and feed the lumber to the saws B. These saws are driven in the usual way by suitable belts $e$, and the shafts $g$ of said saws have their bearings in adjustable arms or brackets $f$, so as to bring the saws in operative position or lower them below the table of the trimmer, as shown in Fig. 6 of the drawings.

The above description of the various parts of a lumber-trimmer include the features that are all of common use in this class of invention, and no claim is laid thereto, but simply shown to illustrate the application of my registering attachment to the trimmer of a sawmill.

The position and location of the lumber-registering attachment with relation to the lumber-trimmer and the several operating parts will be clearly understood by reference to Fig. 5 of the drawings, and as the trimmer forms no part of my invention any suitable construction of trimmer may be substituted for that shown, as the registering attachment is equally applicable to all classes of trimmers of whatever construction where the number of feet in the lumber passing over the trimmer is desired to be ascertained.

To the rotatable shaft $a$ is keyed or otherwise rigidly secured a sprocket-wheel $h$, with which engages a sprocket-chain $i$, and through the power given to said sprocket-chain by the rotatable shaft and the connection of said sprocket-chain with a sprocket-wheel $j$, as shown in Fig. 3 of the drawings, the desired motion is imparted to the various operating parts of the lumber-registering attachment. The sprocket-wheel $j$ is keyed to the end of a short shaft $k$, which has its bearing in the frame of casing C, said frame or casing being of any suitable form and construction to inclose the operating parts of the registering attachment. To one end of the shaft $k$ is keyed a multiple gear D, composed of a series of concentric gears of varying diameters. (Shown in Figs. 1 and 2 of the drawings.) A second multiple gear E of similar construction to the gear D is keyed to one end of a shaft l, and upon the opposite end of the shaft is a gear-wheel F, the teeth of which engage the teeth of a similar but larger gear-wheel G, secured to the base of a suitable register H, rotatable upon a stationary shaft n, provided with a suitable pointer m, as shown in Figs. 3 and 9. A rotatable shaft I extends loosely through a hole in a pivoted bracket n', so that it will enable the shaft to not only rotate, but be raised or lowered, so that the pinions o p upon the ends of the shaft will engage, respectively, with the multiple gears D E or be disengaged therefrom, as desired. The pinions o p are feathered upon the shaft I, so that they will rotate therewith, but are capable of sliding upon the shaft, so as to bring the pinions in mesh each with any particular one of the several concentric rings or toothed gearing on the multiple gears D E, as found desirable.

One of the many means that may be employed to adjust the slidable pinions o p comprises suitable clutches J K, engaging the pinions in the usual manner, so that their rotation with the shaft will not be affected, said clutches being pivotally connected to a pivoted bell-crank lever L and a suitable lever M, respectively, and the shaft I being rocked upon its bearing by a bell-crank lever N. (Shown in Figs. 2 and 12 of the drawings.)

It is preferred that the sprocket-wheel h upon the rotatable shaft a, (indicated in Fig. 5 of the drawings,) be of such circumference as to cause the sprocket-wheel j, (shown in Fig. 3 of the drawings,) to which it conveys motion, to make one revolution while the sprocket-chains d on the trimmer carry the lumber the distance of twelve inches.

Each concentric set of gearing or teeth of the multiple gear D represents a standard length of lumber as found desirable, and the sets of gearing or teeth on the multiple gear E represent the standard thickness of lumber. Thus two multiple gears are employed, each performing their separate functions of designating, in connection with the register H, the standard length and the standard thickness of the lumber, respectively, in order to ascertain the number of feet therein.

The teeth of the pinions o p correspond in number and may be of any suitable construction found best adapted to the purpose, as the general construction of the various gearings employed for operating the register H are subject to many changes or modifications without in any manner affecting the general principle of the invention. The gear-wheel F has an equal number of teeth to the teeth contained in the outer or largest set of concentric gearing in the multiple gear E, and the gear-wheel G being rigidly connected to the base of the register H imparts motion thereto and causes it to rotate.

The gear-wheel G is so constructed as to contain a certain number of teeth, each tooth to represent one-third of a foot of lumber as sawed. Thus when the gear-wheel is made to complete one revolution the register will be carried around and also complete one revolution, the total number of teeth in said gear-wheel representing the total of one hundred feet of lumber, which will be indicated upon the register H by the pointer m upon the end of the stationary shaft around which the register revolves. This, however, may be varied or changed, as found desirable, as I do not wish to confine my invention to the various details of construction herein described, as many changes may be found essential to the effectiveness and practical operation of the device without affecting the essential features thereof.

The rotatable shaft a through the medium of the sprocket-wheel h and sprocket-chain i, which connects with the sprocket-wheel j, imparts motion to the rotatable shaft k and carries with it the multiple gear D, and by means of the pinion o the shaft I is caused to revolve and carries with it the pinion p, and said pinion engaging the teeth of the multiple gear E will rotate the same and also rotate the shaft l and gear-wheel F, and said gear-wheel meshing with the teeth of the gear-wheel G will revolve the register H.

The casing C which contains the operating mechanism is preferably connected to the frame of the trimmer, so that it will be on a level with the top of the trimmer, and as the lumber passes over the same will come in contact with and operate a suitable lever O, projecting up from the casing, the position of the casing with relation to the saws being shown in Fig. 5 of the drawings. A bar comprising a plurality of sections P of suitable length extends along under the trimmer and back of the saws, as shown in Fig. 5 of the drawings, and is supported in suitable brackets depending from the trimmer. This bar connects with the bell-crank lever L, as shown in Fig. 3 of the drawings, said lever operating and shifting the pinion o, so as to engage with the various sets of concentric gears on the multiple gear D, as found desirable. Back of each saw is a suitable bracket q, attached to the cross-bar of the frame of the trimmer, as shown more clearly in Fig. 6 of the drawings, and pivoted to these brackets are suitable levers R, having toothed segments r to engage with pinions s. The levers R extend forward and just over the ends of the arms or brackets f, holding the saws in the trimmer, so that when the brackets are raised by the person operating the trimmer the arms of the brackets will strike the ends of the levers and raise the same. The saws B by such action of the arms or brackets will be elevated to operative position, the saw in Fig. 6 of the drawings being shown lowered and in the position the saw will assume previous to being elevated. Each pinion $s$ is suitably connected to the end of a tubular cam device S, (shown in Fig. 8 of the drawings,) a suitable screw-threaded coupling $t$ being located therein and coupling the screw-threaded ends of the bar-sections P. When the lever R is operated, as previously stated, the segmental gear $r$, which engages the pinion $s$, will cause said pinion to rotate, and with it the tubular cam device S, through the action of the inclined cam-face $u$ bearing against the tooth or projection $v$, which extends from the coupling $t$. The movement of the tubular cam device acting against the tooth or projection on the coupling will move forward said coupling and with it the bar-sections P. The tooth or projection upon the coupling may be placed at any convenient position thereon as circumstances require and may be so located with relation to the coupling that the lever at the rear of the saw on the trimmer, which operates the pinion, will carry the sectional bar a given distance as desired.

The tooth or projection $v$ is preferably placed near the end of the coupling $t$, so that when the lever is raised the tooth or projection will pass the end of the tubular cam device S and cease to move forward, although said cam device may continue to revolve. The lumber passing over the trimmer and under the presser-wheel T, said wheel will be raised a distance equal to the thickness of the lumber, as will also the slidable bar U.

The lever O, hereinbefore referred to, is pivoted to the casing C, as shown at $b$ in Fig. 4 of the drawings, said lever projecting through an elongated slot $c'$ and extending above the plane of the casing directly on line with and under the slidable bar U.

The pivoted lever O has laterally-projecting lugs at its upper end, as shown at $d'$, and at its lower end upon one side thereof is a segmental gear W and a depending arm $e'$, having gravitating weight X to automatically bring the pivoted lever O back to its normal position.

The segmental gear W engages a pinion Y upon the upper end of an upright shaft $f'$, said shaft having its bearings in the casing C of the registering attachment, as shown in Fig. 4 of the drawings. Through the medium of the segmental gear W and the pinion Y the shaft $f'$ is caused to revolve, the slidable bar V extending through the hollow lever O, which forms a guide therefor and also carries the bar, with said lever, when acted upon by the lumber. The gravitating weight X retains the pivoted lever in an upright position when pressure is released therefrom, and the slidable bar V has a right-angle extension $g'$ at its lower end to support the multiple-cam device, comprising a plurality of cam-plates Z of different sizes and diameters, each plate representing a standard thickness of lumber, and said plates are integral with each other and feathered upon the rotatable shaft $f'$, the cam-plates sliding upward and downward thereon.

The sectional bar connected to the frame of the trimmer and comprising the plurality of coupling-sections P may be variously modified and changed, as may also the tubular cam device S, which operates the bar, and any suitable means may be employed for rotating the cam upon its axis through connection with the saw of the trimmer in place of the segmental gear $r$ and pinion $s$.

It will be understood that when the tubular cam device S is rotated or moved upon its axis through the medium of the segmental gear $r$ and pinion $s$ the inclined face $u$ of the tubular cam device S acting against the tooth $v$ will move the sectional bar forward, and said bar connecting with the bell-crank lever L will operate and shift the pinion $o$ upon the rotatable shaft I.

The presser-wheel T, which may be of any suitable construction, is suspended yieldingly over the trimmer, as shown in Fig. 1 of the drawings and in dotted lines in Fig. 2 of the drawings, the shaft $w$ of said wheel having its bearing in the adjustable hanging timber $x$, (shown in Fig. 1 of the drawings,) or any other suitable means may be employed for yieldingly suspending the presser-wheel. One of these presser-wheels is all that is used in connection with my improved registering attachment, the shaft $w$ of said wheel extending through the end of the hanging timber and between suitable lugs $y$, projecting from an upright slidable bar U. Upon the lower end of the bar U is a flange $z$, which intersects with a flange $a'$ upon the upper end of the slidable bar V, thus forming a separable coupling between the two bars, so that the bars may be engaged or disengaged, as required, the coupling ends of the bars being shown in Fig. 4 of the drawings.

It should be understood that the pivoted lever O connects with the presser-wheel T during a part of its movement only, and thereafter it is disconnected through the separable coupling-arms U V, which uncouple and release the connections between the pivoted lever and the presser-wheel.

The cam-plates Z may be of any suitable construction and cast in one piece with the central hub $h'$, thereby not only providing a multiple-cam device that will operate the lever M when required, but its weight will render it gravitating, so that when raised by the upward movement of the sliding bar V the cam device will slide down upon the shaft $f'$ by its own weight immediately upon its being released by the sliding bar and resume its normal position. When the slidable bar V is raised by the action of the slidable bar U through the medium of the presser-wheel T by the lumber coming in contact therewith as the wheel is raised, the bars will also be raised and the flanged end $g'$ on the bar V will lift the gravitating and multiple cam device a distance equal to the distance the presser-wheel and bars are raised. When the upward pressure upon the presser-wheel is released, the gravitating segmental gear W, engaging the pinion Y, will bring the operating parts back to their normal position.

The pivoted lever O is acted upon by the passing lumber and is carried forward on its pivotal connection, and with it the slidable arm V, which will uncouple the flanged ends of the two sliding bars and at the same time remove support from under the gravitating and multiple-cam device, when the device will descend by its own weight upon the shaft $f'$.

The gravitating and multiple-cam device may be of any preferred construction so long as it will successfully act on the lever M and be gravitating in its action.

Any cam device may be used which is multiple in its action or has a plurality of cams varying in their extent of cam action, so that a greater or less movement of the operating parts acting thereon will be governed by the greater or less throw of the cam brought into action to represent a given thickness of lumber. Therefore any suitable multiple-cam device that will accomplish the desired result may be substituted for that shown.

In the operation of the attachment the lumber passing over the trimmer upon the table A will raise the presser-wheel T when it comes in contact therewith, and also, through the connection of said wheel by the shaft $w$ thereof engaging the flanges $y$, the sliding bar U will be raised with the wheel. As the lower end of the sliding bar U engages the upper end of the sliding bar V said latter bar will be also raised an equal distance and will carry with it the cam device upon the shaft $f'$ of a height equal to the thickness of the lumber, which is the distance the slidable bars U and V are raised by the upward movement of the presser-wheel T. In this position that one of the cam-plates which represents the thickness of the lumber will be on a plane opposite the lever M, said lever extending through a guide B'. (Shown in Fig. 2 of the drawings.) The lever M, which is pivotally connected to the clutch K, has its free end reduced, as shown at $i'$, and said lever operates the pinion $p$ to adjust its position upon the rock-shaft I. As the proper cam-plate is brought opposite the end of the lever M, as above described, the lumber as it strikes against the pivoted lever O carries said lever forward, which disconnects projection $z$ upon the lower end of the slidable bar U with the projection or flange $a'$ upon the upper end of the slidable bar V, thereby uncoupling the two bars. The bar U being now disconnected from the bar V, the former bar will remain inactive, and the latter bar, which engages the lever O, will be carried forward by said lever and through the medium of the segmental gear W upon the lever engaging the pinion Y will cause the pinion and shaft $f'$ to rotate and also the multiple-cam device carried by said shaft. The right-angle extension $g'$ is in no manner connected to the multiple-cam device, but simply provides a means for supporting the device and carrying it up on the shaft $f'$ when the slidable bar V is raised and releasing it when the pivoted lever O is in action. The rotation of the multiple cam device acting against the end of the lever M will cause said lever to move forward until the pinion $p$ is opposite to and ready to engage the proper concentric line of gear in the multiple gear E, said gear representing the thickness of lumber passing over the trimmer. The operator now throws up the arm or bracket $f$, (shown in Fig. 6 of the drawings,) to which the shaft of the saw is journaled, said arm or bracket raising the saw to an operative position and at the same time forcing the sectional bar composed of the sections P forward, the movement of the arm or bracket through the medium of the segmental gear turning the pinion $s$ and also the tubular cam device S, acting on the finger or tooth $v$, accomplishing this forward movement of the sectional bar. The sectional bar, composed of the sections P, being connected with the bell-crank lever L will bring the pinion $o$ in position over or opposite its respective line of gear ready to engage therewith. The two pinions $o$ $p$, as hereinbefore described, are now in proper position over their respective multiple gears D E to engage therewith, and when the lumber passes over the table of the trimmer and comes in contact with the lug $d'$ upon the end of the lever O nearest to said lumber the pressure upon the lug will depress the lever below the plane of the casing C through the elongated slot $c'$. As the lever O is depressed by the action of the lumber thereon the opposite one of the lugs $d'$ will be brought into contact with the end of the bell-crank lever N and depress it. The bell-crank lever N being suitably connected to the pivoted bracket $n'$, which supports the rotatable rock-shaft I, said bracket will be moved upon its pivotal connection by the depression of the lever, which action of the lever will rock the shaft I and bring the pinions thereon in mesh with the teeth of the variable gears D E. Although the bell-crank lever N may connect with the pivoted bracket $n'$ in any desirable manner that will operate the same, I prefer the means shown, consisting of the rod $j'$ upon the end of the bracket against which the end of the bell-crank lever comes in contact, so that the bracket is moved upon its axis to rock the shaft I, as shown more clearly in Fig. 12 of the drawings. The sprocket-wheel and chains of the trimmer being in motion instantly convey motion to the operating parts of the registering attachment and will continue in motion so long as the lumber is passing over the lever O, thus registering the number of feet, board-measure, and will invariably cease to register the instant the lever is released and raised to its normal position by the gravitating weight X, operating the segmental gear and pinion. The supporting-bracket $n'$ is spring-actuated—that is to say, as soon as released by the bell-crank lever N the bracket will resume its normal position through the medium of a suitable spring $o'$, acting against the rod $j'$ upon the bracket. Any suitable means may be substituted for that shown for rendering the bracket automatic in its action in resuming its normal position, or, in other words, spring-actuated, as I do not desire to limit my invention to the means shown.

The register H is composed of a plurality of circular disks $k'$, as shown more clearly in Fig. 9 of the drawings, the lower one of said disks, which forms the base of the register, being suitably connected to the gear-wheel G, so that it will turn therewith. The disks $k'$, which bear the proper numerals for registering, are provided with a series of notches $p'$, with which engage spring-actuated pawls $C'$, said notches being upon the under side of the disks and the pawl upon the upper side. The pawl $C'$ is pivoted to the upper side of the disk $k'$ and the spring $D'$ keeps the pawl from engagement with the notches $p'$ until forced to engagement by the finger $q'$ on the notched collar $E'$, secured to the stationary shaft $n'$, which supports the register H. The pawl $C'$ is adapted to engage the notches $p'$ and has a spur $r'$ to engage the notches $s$ on the collar $E'$, the register being rotated through the medium of the gear-wheels F G, connecting with the mechanism hereinbefore described. The notches upon the under side of the disks are ten in number, which divides each disk into ten equal divisions, the base or bottom disk registering one hundred in making a complete revolution. Each division of the remaining disks represented by notches will indicate one in place of ten and in making one complete revolution will register ten. The disks are provided with suitable numerals upon their edge and move independently of each other upon the stationary shaft to which the disks are supported, said disks engaging each other through the medium of the spring-actuated pawls engaging the notches in the disks. These disks will revolve together and also move independently of each other, and when the bottom disk makes one revolution the finger $q'$ on the notched collar $E'$ will come in contact with the spring-actuated pawl $C'$ and cause said pawl to be pressed out in engagement with the notch of the disk above it, and thereby move it the distance of one notch or division when thus registered. The next revolution of the bottom disk will move the disk above it the space of one notch, causing it to register two hundred, and so on up to nine hundred, which designates the number of measured feet in the lumber passing over the trimmer, the various disks, with their pawls and notches, each coacting with the other to properly register the number of feet.

To further illustrate the operation of the attachment in connection with the register, in order to ascertain the number of feet in a piece of lumber passing over the trimmer it will be assumed that an eight-inch board one and one-half inches thick is passing over the trimmer and is trimmed its entire length. As the saw is raised to the position for trimming the lumber the arm or bracket $f$ will raise lever R, causing the segmental gear $r$ to move the pinion $s$, and through the tubular cam S the bar composed of the sections P will be moved forward a distance depending upon which saw is brought into operation, and by means of the bell-crank lever L forming a connection between the sectional bar and the pinion $o$ said pinion will be brought into position over the multiple gear D and ready to engage therewith. The lumber passing under the presser-wheel T raises the wheel and sliding bar U one and one-half inches, thus causing the multiple cam device on the shaft $f'$ to be raised one and one-half inches through the medium of the pivoted lever O and slidable bar V, thereby causing the proper cam-plate $h'$ to be brought on a line opposite the lever M. The lumber now passing the pivoted lever O in a forward direction will cause the multiple cam device, through segmental gear W and pinion Y, to automatically revolve through the medium of the gravitating weight X, which will operate the lever M and cause the pinion $p$ to be brought opposite and ready to engage the multiple gear E, which represents one-and-one-half-inch lumber. The lumber as it continues to move forward will pass over the upper end of the lever O and over the lugs $d'$ thereon and depress the lever and force it against the end of the bell-crank lever N, which action upon the bell-crank lever will rock the rotatable shaft I and bring the pinions $o$ $p$ thereon in engagement with the multiple gears D E, respectively. The gear-wheel F contains ninety teeth, and in making three-fifths of a revolution said wheel will travel the distance of fifty-four feet, thereby causing the gear-wheel G to travel a like number of feet, and as each tooth represents one-third of a foot it will register one-third of fifty-four, which will be eighteen feet. Thus the number of feet contained in a board one and one-half by eight by eighteen will be ascertained.

It should be understood that a piece of lumber two and one-half inches thick, for instance, can only pass and be sold for two-inch lumber. Consequently it must be scaled and registered as if only two inches thick, and if the gravitating and multiple cam device be raised by lumber two and one-half inches it will drop as soon as released a distance that will represent two-inch lumber.

The multiple gears, the rotatable rock-shaft, pinions connecting them together, and means for operating the shaft and pinions, the gravitating and multiple cam device, the means for operating said device and other portions of the mechanism through the action of passing timber, as well as the means for automatically bringing the various parts of the operating mechanism back to their normal position, as well as the construction of the register, may all be changed or modified in the several details of construction without in any manner affecting the principle of the invention, and any such changes or modifications as would come within ordinary mechanical skill may be resorted to and still retain the essential features of the invention, whereby the number of feet in a piece of lumber passing over a trimmer to the saws thereof is automatically recorded and ascertained.

The multiple gears hereinbefore described consist of a plurality of concentric toothed rings or gears, each ring or set of gears representing a standard length of lumber; but I do not wish to be understood as limiting my invention to the number of sets shown, the shifting of the pinions upon the rotatable rock-shaft changing the position thereof to engage with any one of the sets of gears as may be required.

The register, which I have shown in the present instance as composed of a plurality of disks movably connected together and adapted to rotate upon a stationary shaft, is one of many forms that may be used with the registering attachment. Therefore any suitably-constructed register that will serve in connection with the operating mechanism to indicate and register the number of feet (board measure) in a given piece of lumber may be substituted for that shown.

It should be understood that the multiple gear D has one set of gears for each standard length of lumber, three teeth representing each foot in length. Thus the set for twelve-foot lumber would contain thirty-six teeth, for fourteen-foot lumber forty-two teeth, &c., the multiple gears D E in the present instance containing each seven sets of gears, although I do not wish to be limited to any particular number of sets of gears.

In the multiple gear D the smallest set of gears contains thirty-six teeth, which will represent twelve-foot lumber in length, the largest or outside set of gears containing seventy-two teeth and representing twenty-four-foot lumber in length.

The pinions o must be slidable upon the rock-shaft I, so as to engage the various sets of gears on the multiple gear D as the various lengths of lumber are being sawed off or trimmed. Now when the multiple gear D makes one revolution (as the lumber passes the distance of twelve inches over the trimmer) if the lumber be twenty-four feet long the twenty-four-foot saw being raised moves the pinion o (through the action of the bell-crank lever L) to stand opposite the outer or largest set of gear on the multiple gear. If the twelve-foot saw be used to saw the lumber off twelve feet long, the pinion o is carried by the same action, according to the position of the tooth v on the coupling t in conjunction with the tubular cam S, farther from the end of rotatable shaft I until it stands opposite the smallest or inside set of gears, which represent twelve-foot lumber and containing thirty-six teeth. When the pinion o engages with the multiple gear D, if it engages with the largest set it is evident that said pinion will travel the distance of twice the number of teeth as if engaging with the smallest set of gears. Consequently the pinion p, engaging with the multiple gear E, will travel the same and will move the multiple gear the distance of just that many teeth. If the pinion p engages with the outer or largest set of gears on the multiple gear E, it will cause the gear-wheels F G to act in registering that many teeth, which will be the number of feet of one-inch lumber. If the pinion p engages with the smallest set of gears, which contains just one-third the number of teeth as the largest set—viz., thirty—and representing three-inch lumber, it will cause the gear-wheels F G to move the distance represented by three times as many teeth that it would if engaged with the outer or largest set of gears, consequently registering three times as many feet of lumber. The pinion p must be slidable upon the rock-shaft I for the same purpose as pinion o—that is, so as to engage with the various sets of gears in the multiple gear E, which represent the various thicknesses of lumber, as the lumber of different thickness passes over the trimmer.

The thickness of lumber, it should be understood, is ascertained by the rising of the presser-wheel T as the lumber passes under it. The rising of the presser-wheel will act upon the slidable bars U V, and through the medium of said bars, which are elevated with the presser-wheel, the multiple cam device, comprising the cam-plates Z, will be in turn elevated. As the multiple cam device is elevated the cam-plate Z, representing the thickness hereinbefore described of the lumber passing under the presser-wheel T, will be on line with the lever M, and the cam-plate revolving with the rotatable shaft f' and coming in contact with the lever will act thereon and move the lever outward to bring the pinion p to a position on line opposite the set of gears on the multiple gear E that will represent the thickness of lumber being trimmed.

The length of lumber is ascertained by the saw in use, which saw operates the bell-crank lever L through the mechanism hereinbefore described, which forms an intermediate connection between the saw and the bell-crank lever, and the width of lumber is ascertained by the mechanism connecting with the multiple gear D, as has been previously described.

The register (represented in Figs. 3 and 9 of the drawings) is not to show the dimensions of the various pieces of lumber passing over the trimmer, but to register the number of feet (board measure) contained in such pieces irrespective of length, width, or thickness.

It will be seen that every provision is made for a perfect and effective attachment to the trimmer of a sawmill that will be positive in its action and perfect in its results in recording the number of feet (board measure) in any given piece of lumber as it passes over the trimmer of a sawmill, and this with perfect accuracy and exactness.

Having now fully described my invention, what I claim as new, and desire to secure by Letters Patent, is—

1. In a lumber-registering attachment for the trimmers of sawmills, a presser-wheel yieldingly suspended above the table of the trimmer, a pivoted gravitating lever extending up through an opening in the table, and means connecting the lever with the presser-wheel during a part of its movement only, a suitable register and mechanism connecting said register with the lever, substantially as and for the purpose set forth.

2. In a lumber-registering attachment for the trimmers of sawmills, a suitable presser-wheel yieldingly suspended over said trimmer and adapted to yield to the pressure of lumber thereon in passing over the table of the trimmer, a pivoted lever, a vertically-movable bar connecting with the shaft of the presser-wheel, a slidable bar engaging the pivoted lever and carried thereby, said bars being separably connected together, a suitable cam device connecting with the slidable bar, a suitable register and mechanism connecting the register with the cam device, substantially as and for the purpose described.

3. In a lumber-registering attachment for the trimmers of sawmills, a presser-wheel yieldingly suspended over the trimmer, a multiple gravitating cam device, a suitable register, and suitable mechanisms connecting the cam device with the register and the cam device with the presser-wheel, substantially as and for the purpose specified.

4. In a lumber-registering attachment for the trimmers of sawmills, a presser-wheel yieldingly suspended over the trimmer, a multiple gravitating cam device, suitable mechanism connecting the presser-wheel with the cam device, a suitable register, and mechanism connecting with the register and cam device, substantially as and for the purpose set forth.

5. In a lumber-registering attachment for the trimmers of sawmills, a presser-wheel yieldingly suspended over the trimmer, a vertically-movable bar carried by said presser-wheel, a pivoted lever projecting above the table of the trimmer, a slidable bar engaging with the lever, the vertically-movable bar and the slidable bar separably connected together, a multiple and gravitating cam device operated by the slidable bar, and a suitable register, and mechanism connecting the register with the cam device, substantially as and for the purpose described.

6. In a lumber-registering attachment for the trimmers of sawmills, a yieldingly-suspended presser-wheel, a pivoted lever projecting above the table of the trimmer, said lever having a segmental gear, a rotatable shaft having a pinion with which the gear engages whereby the shaft is rotated by the action of the lever, a suitable cam device slidable upon the shaft, a suitable register and mechanism connecting said register with said cam device, substantially as and for the purpose specified.

7. In a lumber-registering attachment for the trimmers of sawmills, a yieldingly-suspended presser-wheel, a pivoted lever projecting above the table of the trimmer, a slidable bar engaging the lever and carried thereby, a vertically-movable bar separably connected to said slidable bar and connecting with the presser-wheel so that it will be operated thereby, a segmental gear upon the end of the pivoted lever and gravitating weight connecting therewith, an upright rotatable shaft and pinion thereon engaging with the segmental gear, a multiple and gravitating cam device slidable upon the shaft and operated by the pivoted lever, a suitable register and mechanism connecting said register with said cam device, substantially as and for the purpose set forth.

8. In a lumber-registering attachment for the trimmers of sawmills, a yieldingly-suspended presser-wheel, a pivoted lever projecting above the table of the trimmer and connecting with the presser-wheel during a part of its movement only, multiple gears, a rotatable rock-shaft, pinions slidable upon said shaft and adapted to engage the multiple gears, mechanism connecting the multiple gears and pinions with the pivoted lever, a suitable register and mechanism connecting said register with the multiple gear, substantially as and for the purpose described.

9. In a lumber-registering attachment for the trimmers of sawmills, a yieldingly-suspended presser-wheel, a pivoted lever projecting above the table of the trimmer, means for connecting the lever with the presser-wheel during a part of its movement only, multiple gears, a rotatable rock-shaft, pulleys slidable upon said shaft, a spring-actuated bell-crank lever connecting with the rock-shaft and operated by the pivoted lever, a suitable register and mechanism connecting said register with the multiple gear, substantially as and for the purpose specified.

10. In a lumber-registering attachment for the trimmers of sawmills, a yieldingly-suspended presser-wheel, a pivoted lever projecting above the table of the trimmer and connecting with the presser-wheel during a part of its movement only, a multiple and gravitating rotatable cam device connecting with the lever, multiple gears, a rotatable rockshaft, pinions slidable thereon and adapted to engage the gears, levers connecting with the pinions for operating them, one of said levers operated by the multiple cam device, a suitable register and mechanism connecting said register with the multiple gear, substantially as and for the purpose set forth.

11. In a lumber-registering attachment for the trimmers of sawmills, a yieldingly-suspended presser-wheel, a pivoted lever projecting above the table of the trimmer and connecting with the presser-wheel during a part of its movement only, multiple gears, a rotatable rock-shaft, pinions slidable thereon, mechanism connecting said rock-shaft with said pivoted lever, a sectional bar extending along the trimmer, teeth projecting therefrom and tubular cam devices operating in connection therewith and connecting with one of the pinions to operate the same, a suitable register, and mechanism connecting said register with said sectional bar, substantially as and for the purpose described.

12. In a lumber-registering attachment for the trimmers of sawmills, a yieldingly-suspended presser-wheel, a pivoted lever extending above the trimmer and connecting with the presser-wheel during a part of its movement only, a rotatable upright shaft connecting with the pivoted lever, a multiple cam device rotatable with said shaft and slidable thereon, a rotatable rock-shaft, a slidable pinion carried by said shaft, a multiple gear with which the pinion engages, a lever connecting with the pinion and operated by the cam device, a suitable register and suitable mechanism connecting said register with said multiple gear, substantially as and for the purpose specified.

13. In a lumber-registering attachment for the trimmers of sawmills, a yieldingly-suspended presser-wheel, a pivoted lever projecting above the table of the trimmer and connecting with the presser-wheel during a part of its movement only, a rotatable shaft and means connecting the shaft with the pivoted lever whereby motion is imparted to said shaft, a gravitating and multiple cam device slidable upon the shaft and rotatable therewith, multiple gears, a rotatable rock-shaft, pinions slidable upon said shaft and carried thereby, a bell-crank spring-actuated lever operated by the pivoted lever which projects above the trimmer, said spring-actuated lever connecting with the rock-shaft to operate it, and suitable levers connecting with the pinions by which their sliding motion is controlled, substantially as and for the purpose set forth.

14. In a lumber-registering attachment for the trimmers of sawmills, a yieldingly-suspended presser-wheel, a pivoted lever projecting above the table of the trimmer and connecting with the presser-wheel during a part of its movement only, multiple gears, a rotatable rock-shaft, pinions carried thereby and slidable thereon, suitable levers connecting with the pinions to control their sliding motion on the rock-shaft, a rotatable multiple cam device and a section-shaft connecting with the saws and cam device upon the shaft for operating the respective levers which connect with the pinions, a suitable register, and mechanism connecting the same with the multiple gear and operating parts of the attachment, substantially as and for the purpose described.

15. In a lumber-registering attachment for the trimmers of sawmills, a yieldingly-suspended presser-wheel, a pivoted lever projecting above the table of the trimmer and connecting with the presser-wheel during a part of its movement only, rotatable multiple gears and a rock-shaft and pinions on said shaft, and a multiple gravitating cam device consisting of a plurality of cam-plates arranged horizontally one above the other, said plates integral with each other and adapted to rotate with an upright shaft and slidable thereon, mechanism operated by the cam device by which one of the pinions is caused to slide upon the rock-shaft and mechanism connecting with the pivoted lever to impart motion to said shaft, a suitable register and suitable mechanism connecting the same with the multiple gear, substantially as and for the purpose specified.

16. In a lumber-registering attachment for the trimmers of sawmills, a yieldingly-suspended presser-wheel, a pivoted lever projecting above the table of the trimmer and connecting with the presser-wheel during a part of its movement only, multiple gears, a rotatable rock-shaft, pinions slidable thereon and rotatable therewith, mechanism connecting said rock-shaft with said pivoted lever, a yieldingly-suspended bracket for supporting the saw, a pivoted lever operated by the bracket and having a toothed segment at its end, a pinion with which said segment engages, a bar extending along the trimmer and provided with a plurality of projections, tubular cam devices adapted to operate in connection with the projections, said bar connecting with the proper one of the toothed segments upon the yieldingly-suspended bracket through the medium of the proper pinion, a suitable register, and mechanism connecting the same with the bar, substantially as and for the purpose set forth.

17. In a lumber-registering attachment for the trimmers of sawmills, a yieldingly-suspended presser-wheel, a pivoted lever projecting above the table of the trimmer and connecting with said wheel during a part of its movement only, a suitable register, a gear-wheel connected to the base thereof to impart motion thereto, an upright rotatable shaft, a gear-wheel thereon engaging the gear-wheel of the register, a multiple gear upon the lower end of the shaft, a multiple gear upon a rotatable shaft having a sprocket-wheel connected thereto by which said shaft connects with the driving-shaft through sprocket wheels and chains to impart motion to the operating parts of the attachment, and suitable pinions engaging the multiple gears, substantially as and for the purpose described.

18. In a lumber-registering attachment for the trimmers of sawmills, a yieldingly-suspended presser-wheel, a pivoted lever projecting above the table of the trimmer, a vertically-movable arm connecting with the shaft of the presser-wheel, an arm extending through the pivoted lever and slidable therein and carried thereby, said arms being separably coupled together, a gravitating segmental gear upon the pivoted lever, an upright rotatable shaft, a pinion thereon to engage the segmental gear, a multiple gravitating cam device slidable upon the shaft and elevated thereon, multiple rotatable gears and pinions engaging therewith, a suitable register and mechanism connecting the same with the multiple gear, substantially as and for the purpose specified.

19. In a lumber-registering attachment for the trimmers of sawmills, a yieldingly-suspended presser-wheel, a pivoted lever projecting above the table of the trimmer, a vertically slidable and rotatable multiple cam device, multiple rotatable gears, slidable and rotatable pinions engaging therewith, suitable mechanism connecting the multiple cam device with one of the pinions and suitable mechanism connecting with the opposite pinion whereby the slidable action is controlled, and a suitable register connecting with the operating mechanism, substantially as and for the purpose set forth.

20. In a lumber-registering attachment for the trimmers of sawmills, a yieldingly-suspended presser-wheel, a pivoted lever projecting above the table of the trimmer and adapted to be operated upon by the lumber coming in contact therewith, said lever connecting with the presser-wheel during a part of its movement only, a vertically-slidable, gravitating and rotatable multiple cam device, suitable means connecting with the pivoted lever for operating said cam device, multiple rotatable gears, a rotatable rockshaft, pinions rotatable with the shaft and slidable thereon, suitable mechanism for controlling the sliding motion of the pinions upon the rock-shaft, a spring-actuated bell-crank lever connecting with the rock-shaft and operated by the pivoted lever which projects above the trimmer, and a suitable register connecting with the operating parts of the attachment, substantially as and for the purpose described.

In testimony whereof I affix my signature in presence of two witnesses.

WILLIAM G. BOSWELL.

Witnesses:
NELS A. ERIKSON,
JOHN DRIELING.